(12) United States Patent
Shen

(10) Patent No.: US 11,771,987 B2
(45) Date of Patent: Oct. 3, 2023

(54) LIMBO SPECTATING IN A VIDEO GAME

(71) Applicant: NETEASE (HANGZHOU) NETWORK CO., LTD., Zhejiang (CN)

(72) Inventor: Jiabo Shen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/960,631

(22) PCT Filed: Nov. 15, 2019

(86) PCT No.: PCT/CN2019/118750
§ 371 (c)(1),
(2) Date: Jul. 8, 2020

(87) PCT Pub. No.: WO2020/238067
PCT Pub. Date: Dec. 3, 2020

(65) Prior Publication Data
US 2022/0096930 A1  Mar. 31, 2022

(30) Foreign Application Priority Data

May 30, 2019 (CN) .......................... 201910465406.X

(51) Int. Cl.
| | | |
|---|---|---|
| *A63F 13/5258* | (2014.01) | |
| *A63F 13/86* | (2014.01) | |
| *G06T 19/00* | (2011.01) | |
| *A63F 13/533* | (2014.01) | |
| *A63F 13/52* | (2014.01) | |
| *A63F 13/5372* | (2014.01) | |
| *G06F 3/0482* | (2013.01) | |
| *G06F 3/0484* | (2022.01) | |
| *A63F 13/822* | (2014.01) | |

(52) U.S. Cl.
CPC ............ *A63F 13/533* (2014.09); *A63F 13/52* (2014.09); *A63F 13/5372* (2014.09); *G06F 3/0482* (2013.01); *G06F 3/0484* (2013.01); *A63F 13/822* (2014.09); *A63F 2300/306* (2013.01); *A63F 2300/308* (2013.01); *A63F 2300/6684* (2013.01)

(58) Field of Classification Search
None
See application file for complete search history.

(56) References Cited

U.S. PATENT DOCUMENTS

| | | | |
|---|---|---|---|
| 2008/0119286 A1* | 5/2008 | Brunstetter | ............. A63F 13/95 463/43 |
| 2017/0003740 A1 | 1/2017 | Verfaillie et al. | |
| 2017/0006074 A1* | 1/2017 | Oates, III | ............. H04N 21/472 |
| 2017/0246544 A1* | 8/2017 | Agarwal | ................. A63F 13/63 |
| 2020/0197807 A1* | 6/2020 | Tieger | ..................... G06T 19/00 |

FOREIGN PATENT DOCUMENTS

| | | |
|---|---|---|
| CN | 106730839 A | 5/2017 |
| CN | 108043033 A | 5/2018 |
| CN | 108965301 A | 12/2018 |
| CN | 110180169 A | 8/2019 |
| KR | 101919567 B1 | 2/2019 |

OTHER PUBLICATIONS

"The game players who use bots are worried now. Since Players Unknown's Battlegrounds (PUBG) will launch a watching system, and so each game player can be a reviewer." Published on Apr. 4, 2018, 11:02:52AM.
"Announcement of the 9th update of version 1.0", Apr. 3, 2018.
"How to watch a big attack of the whole army in Players Unknown's Battlegrounds (PUBG)?How to watch a player who is not in your team." Written by MiMi and published at Mar. 4, 2018.
"Stimulus Battlefield" finally has a function of watching opponent, and the official assessed in two words! Written by A-dragon-in-Esports and published at Sep. 9, 2018, 08:25AM.
Analysis of the development status of game live broadcast platform in China published by <Media> (2018, Issue 12).
The ISR issued Mar. 13, 2020 by the WIPO.
The CN1OA issued Dec. 27, 2019 by the CNIPA.
The CN2OA issued Mar. 16, 2020 by the CNIPA.

* cited by examiner

*Primary Examiner* — Lawrence S Galka
(74) *Attorney, Agent, or Firm* — Qinghong Xu

(57) ABSTRACT

The present disclosure relates to a game screen display method, a game screen display apparatus, a computer-readable storage medium, and an electronic device, which belongs to the technical field of game screen processing. The game screen display method includes: determining a second virtual character according to a preset selection operation, when it is detected that the first virtual character is in a first specific state; acquiring a second game perspective corresponding to the second virtual character, and displaying a game screen corresponding to the second game perspective in the graphical user interface; and displaying a control operation screen corresponding to the second virtual character in the graphical user interface; wherein operation instruction information of a preset control in the control operation screen corresponds to a virtual action of the second virtual character in the game screen.

18 Claims, 7 Drawing Sheets

LIMBO SPECTATING IN A VIDEO GAME

CROSS-REFERENCE TO RELATED APPLICATIONS

This application is the 371 application of PCT Application No. PCT/CN2019/1.18750, filed on Nov. 15, 2019, which claims the priority of the Chinese Patent Application No. 201910465406.X, entitled 'Game Screen Displaying Method and Apparatus, Storage Medium, Electronic Device' filed on May 30, 2019, the entirety of both which are incorporated by reference.

TECHNICAL FIELD

Embodiments of the present disclosure relate to the technical field of game screen processing, and in particular, to a game screen display method, a game screen display apparatus, a computer-readable storage medium, and an electronic device.

BACKGROUND

In MOBA (Multiplayer Online Battle Arena) game, there has a high requirement for operation. Therefore, it is difficult for novice users to get started, and it is easier to be killed in the game and enter a state of death during the early growth process.

In the current game design, after a user enters a dead state, there are two ways for the user to choose. One way is that in some games, after the user dies, i.e., after entering the dead state, the user needs to make a choice of 'exiting' or 'watching the battle in game'. If the user chooses 'exiting', he will exit the game, that is, ending the game; and if the user chooses 'watching the battle in game', he can arbitrarily select a surviving user present in the game and his perspective is consistent with the selected surviving user's perspective. The other way is that, in some games, after the user dies, a countdown to resurrection is entered, and the scene is suppressed to distinguish the scene before death. The user can only slide the map at this time, and check engagement situation of other users on the map until resurrection. After resurrection, the user re-enter the battle.

It should be noted that the information disclosed in the above background section is only for enhancing the understanding of the background of the present disclosure, and therefore may include information that does not constitute prior art known to those of ordinary skill in the art.

SUMMARY

According to a first aspect of the disclosure, there is provided a game screen display method, a graphical user interface is rendered by executing a game application, and the graphical user interface is used to display a game screen corresponding to a first game perspective which corresponds to a first virtual character, the game screen display method includes:

determining a second virtual character according to a selection operation triggered by a user, when it is detected that the first virtual character is in a first specific state;

acquiring a second game perspective corresponding to the second virtual character, and displaying a game screen corresponding to the second game perspective in the graphical user interface; and displaying a control operation screen corresponding to the second virtual character in the graphical user interface; wherein operation instruction information of a preset control in the control operation screen corresponds to a virtual action of the second virtual character in the game screen.

According to a second aspect of the disclosure, there is provided a game screen display apparatus, a graphical user interface is rendered by executing a game application, and the graphical user interface is used to display a game screen corresponding to a first game perspective which corresponds to a first virtual character, the game screen display apparatus includes:

a detection module, configured to determine a second virtual character according to a selection operation triggered by a user, when it is detected that the first virtual character is in a first specific state;

a first display module, configured to acquire a second game perspective corresponding to the second virtual character, and display a game screen corresponding to the second game perspective in the graphical user interface; and a second display module, configured to display a control operation screen corresponding to the second virtual character in the graphical user interface; wherein operation instruction information of a preset control in the control operation screen corresponds to a virtual action of the second virtual character in the game screen.

According to a third aspect of the disclosure, there is provided a computer-readable storage medium, having a computer program stored thereon, wherein the computer program, when being executed by a processor, implements the game screen display method according to any one of forgoing embodiments.

According to a fourth aspect of the disclosure, there is provided an electronic device, including:

a processor; and a memory for storing instructions executable by the processor;

wherein, the processor is configured to implement, by executing the instructions, the game screen display method according to any one of forgoing embodiments.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Obviously, the drawings in the following description are only some embodiments of the present disclosure. For those of ordinary skill in the art, without paying any creative work, other drawings can also be obtained based on these drawings.

DETAILED DESCRIPTION

Figure 1:
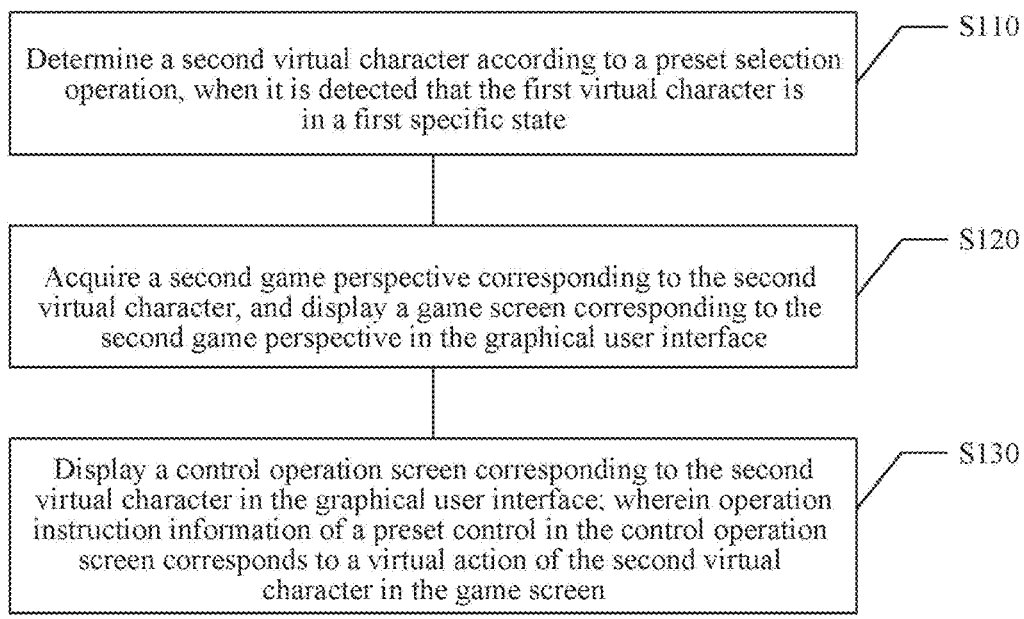
FIG. 1 schematically shows a flowchart of a game screen display method according to an exemplary embodiment of the present disclosure.
Figure 2:
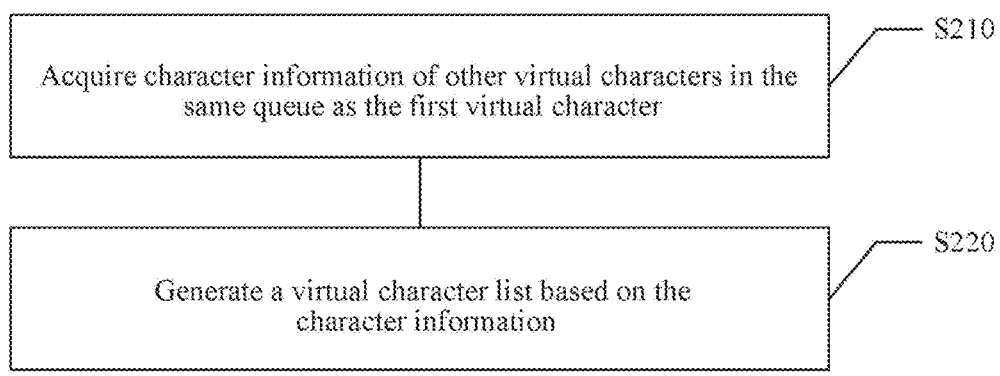
FIG. 2 schematically shows a flowchart of another game screen display method according to an exemplary embodiment of the present disclosure.

Exemplary embodiments will now be described more fully with reference to the accompanying drawings. However, the exemplary embodiments can be implemented in various forms and should not be construed as limited to the embodiments set forth herein. Instead; these embodiments are provided so that the disclosure will be thorough and complete; and will fully convey the concept of exemplary embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or by using other methods, components, materials, devices, steps and the like. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings identify the same or similar parts, and thus repeated descriptions thereof will be omitted. Some of the block diagrams shown in the drawings indicate functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

The terms 'a', 'an', 'the' and 'said' are used to indicate the presence of one or more elements/components etc.; the terms 'include' and 'have' are used to indicate open-ended inclusions and means that there have additional elements/components etc. in addition to the listed elements/components etc.; the terms 'first' and 'second' etc. are used only as marks, not the limitation to the number of objects.

The existing two ways have the following defects. On the one hand, in case of that the user chooses a surviving user to watch the battle with the perspective of the surviving user, he only can select one user blindly, so that the accuracy of the selection result is low. On the other hand, in case of that the user quit the game, he cannot continue to participate in the game, which makes the user experience poor and easy to cause user churn. Furthermore, if the scene of the dead user is suppressed, the user cannot interact with teammates, and then the user cannot observe the teammates and their surroundings.

Therefore, there is a need to provide a new game screen display method and apparatus in a game.

In this example embodiment, a game screen display method is firstly provided. A graphical user interface is rendered by executing a game application, and the graphical user interface is used to display a game screen corresponding to a first game perspective which corresponds to a first virtual character. The first game perspective is a game perspective of the first virtual character.

It should be noted that in games, a virtual camera is usually set in a game scene, and the game screen rendered on the graphical user interface is game scene content photographed by the virtual camera.

In the present exemplary embodiment, the first virtual character, that is, a virtual character controlled by the current user, is configured to perform a preset virtual action in the game scene, in response to a touch operation acted on the first device terminal.

The game screen corresponding to the first game perspective of the first virtual character refers a game scene content photographed by a virtual camera having a preset binding relationship with the first virtual character. For example, in a first-person game, a virtual camera may be set on the head of the first virtual character. The virtual camera moves following the movement of the first virtual character, and orientation of the virtual camera rotates following the rotation of the first virtual character. The game screen corresponding to the first game perspective of the first virtual character refers to a game screen captured during the movement and/or rotation of the virtual camera following the first virtual character. For another example, in the third-person game, a virtual camera may be set back above or directly above the first virtual character, the virtual camera moves following the movement of the first virtual character, so the game screen corresponding to the first game perspective of the first virtual character refers to a game screen captured during the movement of the virtual camera following the first virtual character.

Further, this method can be run on a mobile terminal, such as a mobile phone, a tablet computer, and PCs. Of course, those skilled in the art can also run the method of the present disclosure on other platforms according to requirements, Which will not defined in this exemplary embodiment. Referring to FIG. 1, the game screen display method in the game may include the following steps:

At step S110, when it is detected that the first virtual character is in a first specific state, a second virtual character is determined according to a preset selection operation.

At step S120, a second game perspective corresponding to the second virtual character is acquired, and a game screen corresponding to the second game perspective is displayed in the graphical user interface.

At step S130, a control operation screen corresponding to the second virtual character is displayed in the graphical user interface; wherein operation instruction information of a preset control in the control operation screen corresponds to a virtual action of the second virtual character in the game screen.

In the game screen display method in the above game, on the one hand, when it is detected that the first virtual character is in the first specific state, the second virtual character is determined according to the preset selection operation, so that the user can select a desired second virtual character according to the preset selection operation. It solves the problems, such as only one user can be selected blindly in the prior art and the accuracy of the selection result low, and the accuracy of the user selection result is improved. On the other hand, by acquiring the second game perspective corresponding to the second virtual character, and displaying the game screen corresponding to the second game perspective in the graphical user interface; and then displaying the control operation screen corresponding to the second virtual character in the graphical user interface, the user can continue to watch the battle in the game, when the first virtual character controlled by the user being killed in the battle and the user cannot play the game. At the same time, the game screen of the second virtual character controlled by a party being watched in the battle, as well as roulette and a skill usage status of the party in the battle will be displayed to the user simultaneously. It solves the problems that the user cannot understand operations of players on the field in detail in the prior art, which makes the user experience poor, so that user experience is improved. Furthermore, it solves the problems that the user cannot interact with teammates in the existing technology and then he is unable to observe the teammates and their surrounding battle conditions, so that the user can watch the entire game throughout the game, which further improves user experience.

In the following, each step in the game screen display method in the game above-mentioned in this exemplary embodiment will be explained in detail with reference to the drawings.

In step S110, when it is detected that the first virtual character is in a first specific state, a second virtual character is determined according to a preset selection operation.

In this exemplary embodiment, as described above, the first virtual character is a virtual character that can be controlled by a current player who manipulates the first device terminal. The first specific state is a death state, that is, the first virtual character controlled by the current player is killed by other one or more virtual characters controlled by one or more players belonging to different queues or enemy camps in the game, which means a state of losing vital signs.

The second virtual character refers to a virtual character controlled by other one or more device terminals manipulated by other one or more user or player other than the virtual character controlled by current player or current user in a multiplayer online battle arena.

In the present exemplary embodiment, the second virtual character is a virtual character that satisfies a preset condition and is in a second specific state.

Specifically, the second specific state is a surviving state, that is, a state that the virtual character controlled by other one or more players can continue to play or fight in the game.

The preset condition is that belongs to the same queue as the first virtual character, and a watching battle mode is enabled.

Further, in this exemplary embodiment, when it is detected that the first virtual character is in the first specific state (in the dead state), in order to facilitate the user to select a second virtual character that he needs, the game screen display method in the game according to the present disclosure further includes steps S210 and S220, which will be described in detail below.

In step S210, character information of other one or more virtual characters in the same queue as the first virtual character is acquired.

In step S220, a virtual character list is generated based on the character information.

Figure 3:
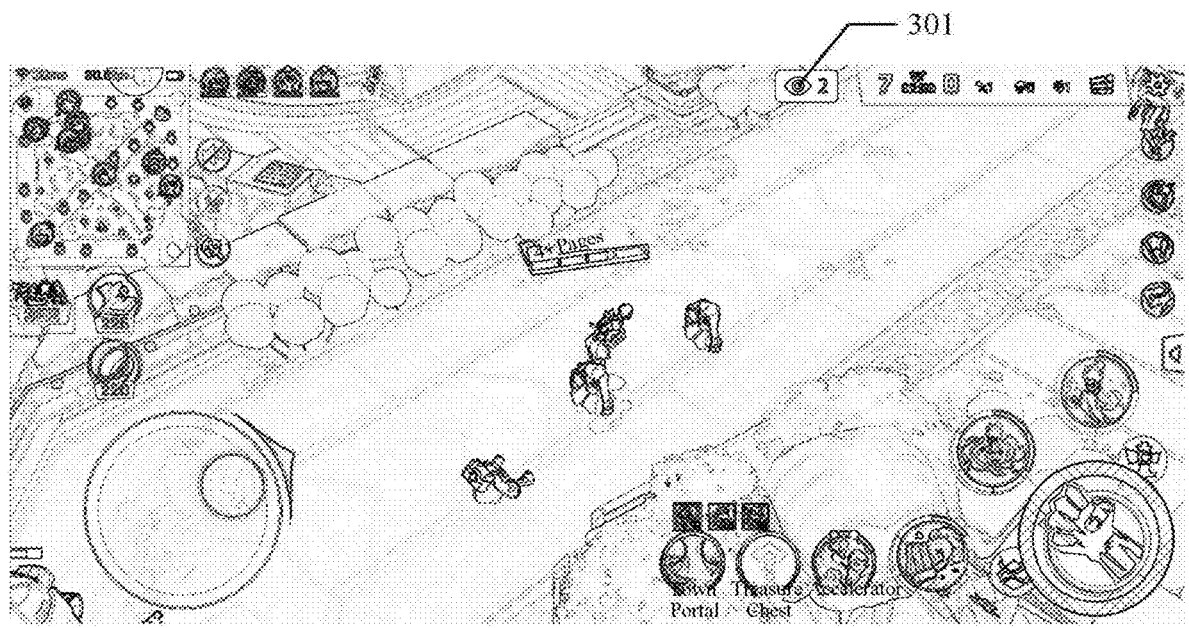
FIG. 3 schematically illustrates an example application scene of a game screen display method according to an exemplary embodiment of the present disclosure.

Next, steps S210 and S220 will be explained and described in details. First, the character information of other one or more virtual characters of one or more teammates in the same queue as the first virtual character can be acquired wherein the character information of other virtual characters can include a historical selecting number, which means the number of times that he has been selected historically (for example, referring to 301 at the top of FIG. 3, the historical selecting number is two, that is, the user has been selected twice historically), and a character name (i.e., a username in the game), which refers to the name of the virtual character. The character information can also include a current remaining Health Point (HP) value, etc. This example does not specifically make limitation about this. Secondly, after acquiring the historical selecting number and the character name, other virtual characters mentioned above can be ranked according to one of followings: order of the historical selecting number of other virtual characters, such as from high to low or from low to high; a corresponding first letter included in the character names of other virtual characters (order of the corresponding first letter in the alphabetical list); and order of the current remaining Health Point (HP) value of other virtual characters, such as from high to low or from low to high, and then the virtual character list is generated based on the ranked other one or more virtual characters.

Further, after obtaining the virtual character list, a virtual character corresponding to the preset selection operation in the virtual character list may be determined as a second virtual character, in response to the preset selection operation acted on the virtual character list. For example, after detecting that each of other virtual characters turns on the watching battle mode mentioned above, the user can determine the second virtual character according to the virtual character list for viewing.

Further, in order to facilitate the user to view, avoid selecting a second virtual character, and this second virtual character is also be killed in a relatively short time, so that the user needs to make a second selection, which reduces the user experience, the game screen display method in game may further include: determining whether the historical selecting number is greater than a preset threshold; if the historical selecting number is greater than the preset threshold, generating the virtual character list according to the order of the historical selecting number, such as from high to low or from low to high. For example, when the number of times that he has been selected historically (i.e. the historical selecting number) is less than the preset threshold, such as zero or only once, this type of virtual characters can be directly filtered out, that is to say, the virtual characters whose historical selecting number is lower than the preset threshold may be directly filtered out. And then the virtual characters whose historical selecting number is greater than the preset threshold may be ranked again. By using this method, the accuracy of the selection result can be further improved, thereby improving the user experience.

In step S120, a second game perspective corresponding to the second virtual character is acquired, and a game screen corresponding to the second game perspective is displayed in the graphical user interface.

In this exemplary embodiment, the second virtual character is configured to perform a preset virtual action in the game scene in response to a touch operation acting on a second device terminal, that is, the second virtual character is a virtual character controlled by other one or more users other than the current user.

The game screen corresponding to the second game perspective of the second virtual character refers to a game scene content photographed by a virtual camera having a preset binding relationship with the second virtual character. For example, in a first-person game, a virtual camera may be set on the head of the second virtual character. The virtual camera moves following the movement of the second virtual character, and orientation of the virtual camera rotates following the rotation of the second virtual character. The game screen corresponding to the second game perspective of the second virtual character refers to a game screen captured during the movement and/or rotation of the virtual camera following the second virtual character. For another example, in the third-person game, a virtual camera may be set back above or directly above the second virtual character, the virtual camera moves following the movement of the second virtual character, and the game screen corresponding to the second game perspective of the second virtual character refers to a game screen captured during the movement of the virtual camera following the second virtual character.

Figure 4:
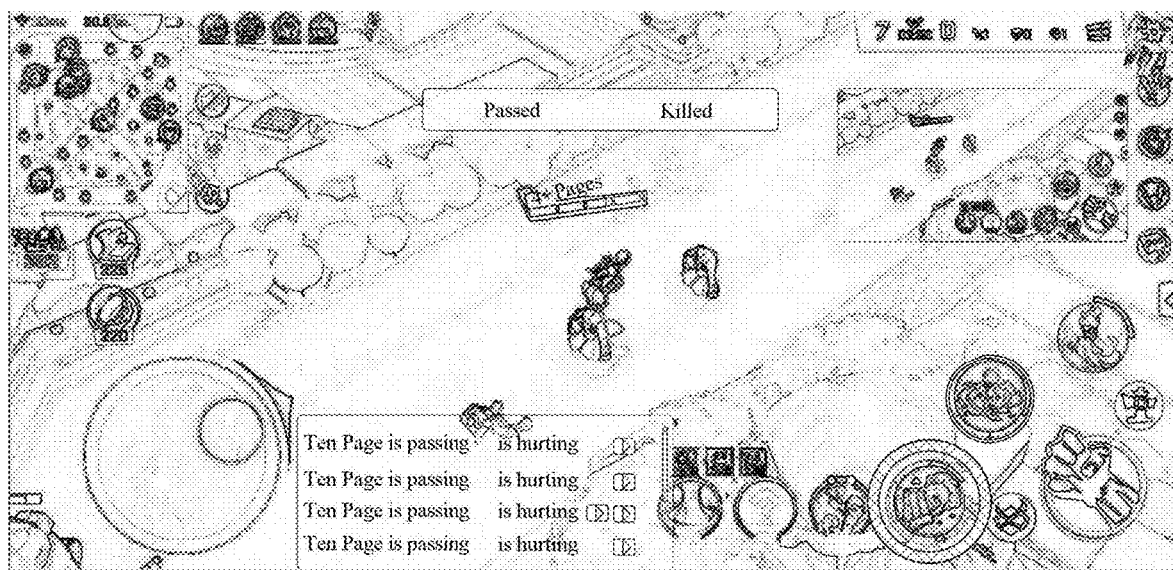
FIG. 4 schematically illustrates an example application scene of another game screen display method according to an exemplary embodiment of the present disclosure.

Further, in this exemplary embodiment, referring to FIG. 4, after the second virtual character is determined, a second game perspective of the second virtual character may be acquired, and then a game screen corresponding to the second game perspective is displayed in the graphical user interface.

Further, acquiring the second game perspective corresponding to the second virtual character may include: invoking a perspective interface corresponding to the second virtual character, and acquiring the second game perspective based on the perspective interface. Specifically, since the game perspective of each virtual character has a corresponding perspective interface, the corresponding game perspective may be obtained by invoking the perspective interface of the game perspective, and then using the perspective interface.

In step S130, a control operation screen corresponding to the second virtual character is displayed in the graphical user interface; wherein operation instruction information of a preset control in the control operation screen corresponds to a virtual action of the second virtual character in the game screen.

In this exemplary embodiment, firstly, the control operation screen corresponding to the second virtual character may be acquired by the above-mentioned perspective interface, and then the control operation screen corresponding to the second virtual character is displayed in the graphical user interface. Wherein operation indication information of the preset control in the control operation screen corresponds to a virtual action of the second virtual character in the game screen. Continuing to refer to FIG. 4, for example, if the virtual character moves toward the upper right, a moving joystick displays an arrow pointing to the upper right. Other visual indication methods can also be used. For another example, if the virtual character executes ordinary attack-→skill 1→skill 3→skill 2 in sequence, a right-side skill control will give a visual indication in synchronization with an execution order of the virtual character, such as highlighting. When the teammate being watched controls the second virtual character to perform an action, the operation interface of the teammate will be synchronously displayed to the first terminal, i.e. the terminal that controls the first virtual character.

Further, in order to facilitate the user to find a second virtual character among the numerous virtual characters, the game screen display method in the game may further include marking a character identification corresponding to the second virtual character in the graphical user interface; wherein the character identification includes at least one of a text identification and an image identification. Specifically, the character identification (text or picture) corresponding to the second virtual character in the graphical user interface can be marked by means of a box or a text mark, etc., so that the user can check the operation skills of the second virtual character in time.

Figure 5:
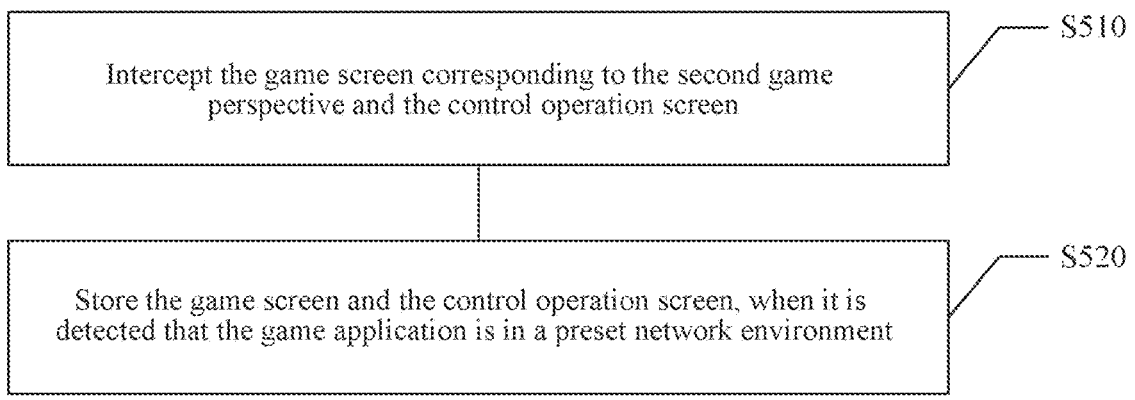
FIG. 5 schematically shows a flowchart of another game screen display method according to an exemplary embodiment of the present disclosure.

FIG. 5 exemplarily shows a flowchart of another game screen display method according to an example embodiment of the present disclosure. Referring to FIG. 5, the game screen display method in the game may further include step S510 and step S520, which will be described in detail below.

In step S510, the game screen corresponding to the second game perspective and the control operation screen are intercepted.

In step S520, when it is detected that the game application is in a preset network environment, the game screen and the control operation screen are stored.

Next, steps S510 and S520 will be explained and described. Firstly, the game screen corresponding to the second game perspective and the control operation screen may be intercepted, and when it is detected that the game application is in the preset network environment (Wi-Fi environment), the game screen and the control operation screen are stored. By using this method, on the one hand, it can save the user's network traffic; on the other hand, the user can also view the stored operation screen and virtual actions for easy learning.

Hereinafter, the example embodiments involved in the present disclosure will be further explained and described in conjunction with specific application scenarios.

In the death state (i.e. the first specific state) of the first virtual character, the player/user who controls the first virtual character can choose a surviving one from other virtual characters in the battle to watch the battle; the second game perspective screen of the second virtual character who is been watched, and the roulette and skill control usage status of player who is controlling the second virtual character will be broadcast lively to the terminal that controls the first virtual character, that is, the player/user who controls the first virtual character can view the manipulating process of the second virtual character by watching the battle in game; kill Toast (which provides a simple feedback for an operation) in game preferentially broadcasts the skill control usage situation and damage/kill situation of the player who is been watched. Furthermore, a history operation list will record operation records of the watched player, and record a video about injury/kill moments for players to watch and learn repeatedly.

Furthermore, in the history operation list, the system will evaluate a damage value caused by the operation of the player who is been watched, which is indicated by different color level identifications, to help the player to select and watch. The player who is been watched can get extra rewards after the game according to the number of times he had been watched. For novice players, they can learn more about the operations of players on the field in a variety of ways provided by the system in the present disclosure, to provide more operational possibilities for players in death mode, so that they will not quit the game immediately. By watching with a purpose, frustration of the player after being defeated during a learning period is partially offset, making the player to have a certain loyalty to the game, and improving the ease of use about the game at the same time. For advanced players, the watching battle mode can satisfy a demand of 'dazzling their skills', and their continued interest in the game can be stimulated by getting more rewards, thereby reducing boredom with games.

Figure 6:
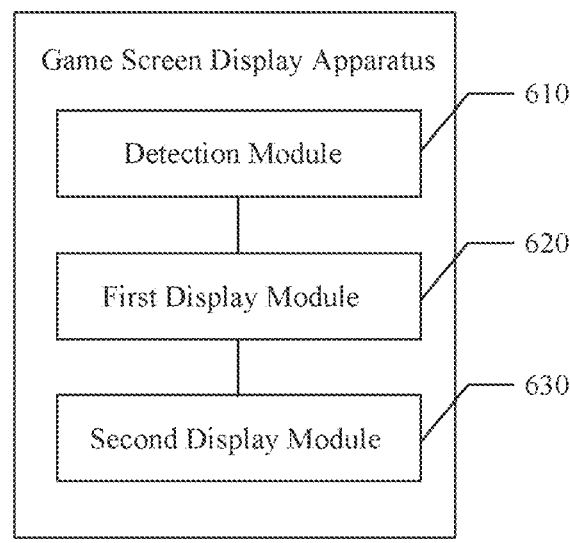
FIG. 6 schematically shows a block diagram of a game screen display apparatus according to an exemplary embodiment of the present disclosure.

The present disclosure also provides a game screen display apparatus, which renders a graphical user interface by executing a game application, and the graphical user interface is used to display a game screen corresponding to a first game perspective which corresponds a first virtual character. Referring to FIG. 6, the game screen display apparatus may include a detection module 610, a first display module 620, and a second display module 630.

The detection module 610 is configured to determine a second virtual character according to a preset selection operation, when it is detected that the first virtual character is in a first specific state.

The first display module 620 is configured to acquire a second game perspective corresponding to the second virtual character, and display a game screen corresponding to the second game perspective in the graphical user interface.

The second display module 630 is configured to display a control operation screen corresponding to the second virtual character in the graphical user interface; wherein operation instruction information of a preset control in the control operation screen corresponds to a virtual action of the second virtual character in the game screen.

In an exemplary embodiment of the present disclosure, the second virtual character is a virtual character that satisfies a preset condition and is in a second specific state.

In an exemplary embodiment of the present disclosure, the game screen display apparatus further includes a marking module.

The marking module is configured to mark a character identification corresponding to the second virtual character in the graphical user interface; wherein the character identification includes at least one of a text identification and an image identification.

In an exemplary embodiment of the present disclosure, the game screen display apparatus in the game mentioned above further includes a screen intercepting module and a storage module.

The screen intercepting module is configured to intercept the game screen corresponding to the second game perspective and the control operation screen.

The storage module is configured to store the game screen and the control operation screen, when it is detected that the game application is in a preset network environment.

In an exemplary embodiment of the present disclosure, the acquiring a second game perspective corresponding to the second virtual character includes invoking a perspective interface corresponding to the second virtual character, and acquiring the second game perspective based on the perspective interface.

In an exemplary embodiment of the present disclosure, the game screen display apparatus in the game mentioned above further includes a character information acquiring module and a virtual character list generating module.

The character information acquiring module is configured to acquire character information of other virtual characters in the same queue as the first virtual character.

The virtual character list generating module is configured to generate a virtual character st based on the character information.

In an exemplary embodiment of the present disclosure, the determining the second virtual character according to the preset selection operation includes in response to the preset selection operation acted on the virtual character list, determining a virtual character corresponding to the preset selection operation in the virtual character list as the second virtual character.

In an exemplary embodiment of the present disclosure, the character information includes a historical selecting number and/or a character name.

The generating the virtual character list based on the character information includes generating the virtual character list based on order of the historical selecting number, such as from high to low or from low to high, and/or order of a first letter included in the character name in alphabetical order.

In an exemplary embodiment of the present disclosure, the generating the virtual character list based on the order of the historical selecting number includes determining whether the historical selecting number is greater than a preset threshold; and generating the virtual character list based on the order of the historical selecting number, such as from high to low or from low to high, if the historical selecting number is greater than the preset threshold.

The specific details of respective modules of the game screen display apparatus in game mentioned above have been described in detail in the corresponding game screen display method in game, so it will not be repeated here.

It should be noted that although several modules or units of the apparatus for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the exemplary embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

An exemplary embodiment of the present disclosure also provides an electronic device capable of implementing the above methods.

Those skilled in the art can understand that various aspects of the present disclosure may be implemented as a system, method, or program product. Therefore, various aspects of the present disclosure can be embodied in the following forms: a complete hardware implementation, a complete software implementation (including firmware, microcode, etc.), or a combination of hardware and software, which can be collectively referred to as "circuit", "module", or "system".

An electronic device 700 according to an exemplary embodiment of the present disclosure is described below with reference to FIG. 7. The electronic device 700 shown in FIG. 7 is only an example, and should not impose any limitation on the functions and scope of use of the embodiments of the present disclosure.

Figure 7:
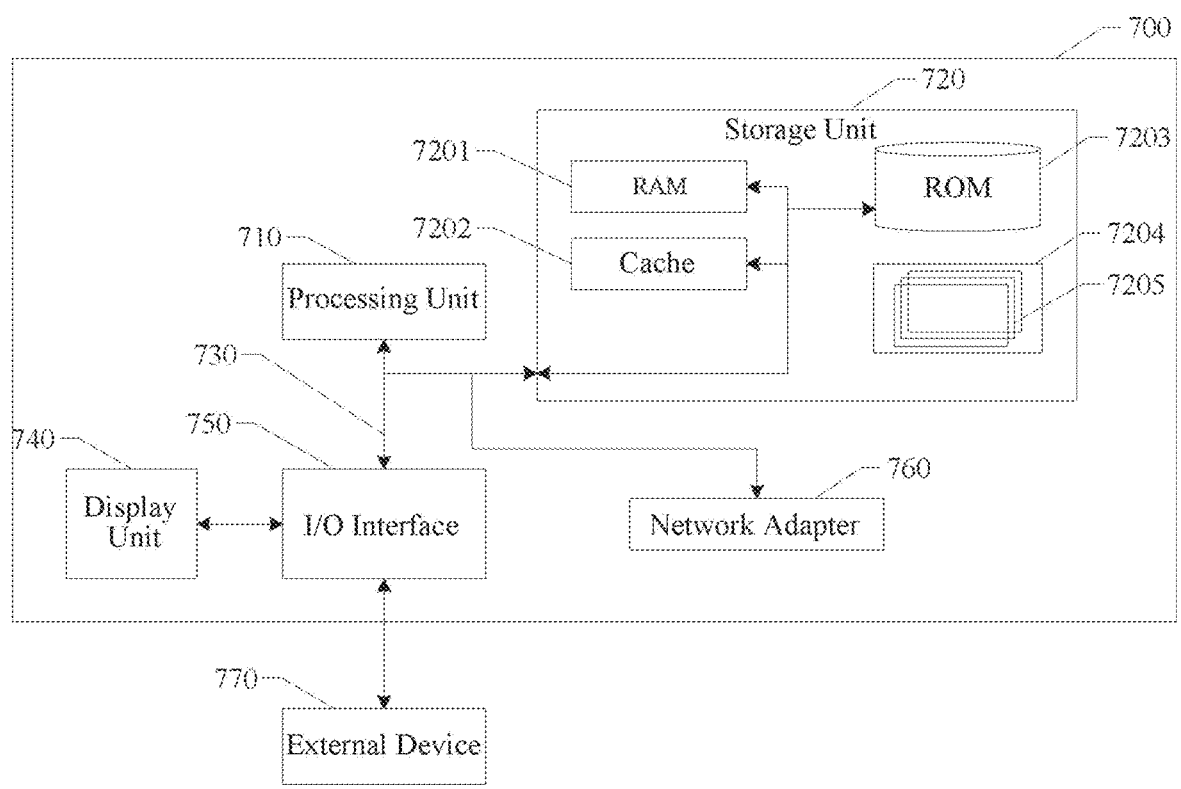
FIG. 7 schematically shows an electronic device for implementing the game screen display method above-mentioned according to an exemplary embodiment of the present disclosure.

As shown in FIG. 7, the electronic device 700 is shown in the form of a general-purpose computing device. The components of the electronic device 700 may include, but are not limited to, at least one processing unit 710, at least one storage unit 720, and a bus 730 connecting different system components (including the storage unit 720 and the processing unit 710).

The storage unit stores program codes, and the program codes can be executed by the processing unit 710, so that the processing unit 710 executes the steps of various exemplary embodiments according to the present disclosure described in the "exemplary methods" section of the present specification. For example, the processing unit 710 may perform the steps shown in FIG. 1. In step S110, when it is detected that the first virtual character is in a first specific state, a second virtual character is determined according to a preset selection operation. In S120, a second game perspective corresponding to the second virtual character is acquired, and a game screen corresponding to the second game perspective is displayed in the graphical user interface. In S130, a control operation screen corresponding to the second virtual character is displayed in the graphical user interface; wherein operation instruction information of a preset control in the control operation screen corresponds to a virtual action of the second virtual character in the game screen.

The storage unit 720 may include a readable medium in the form of a volatile storage unit, such as a random access storage unit (RAM) 7201 and/or a cache storage unit 7202, and may further include a read-only storage unit (ROM) 7203.

The storage unit 720 may further include a program/utility tool 7204 having a set (at least one) of program modules 7205. Such program modules 7205 include, but are not limited to, an operating system, one or more application programs, other program modules, and program data. Each or some combination of these examples may include an implementation of a network environment.

The bus 730 may be one or more of several types of bus structures, including a memory unit bus or a memory unit controller, a peripheral bus, a graphics acceleration port, a processing unit, or a local area bus using any bus structure in a variety of bus structures.

The electronic device 700 may also communicate with one or more external devices 770 (such as a keyboard, a pointing device, a Bluetooth device, etc.), and may also communicate with one or more devices that enable a user to interact with the electronic device 700, and/or may also communicate with any device (such as a router, a modem) that can enable the electronic device 700 to interact with one or more other computing devices. Such communication can be performed through an input/output (I/O) interface 750. Moreover, the electronic device 700 may also communicate with one or more networks (such as a local area network (LAN), a wide area network (WAN), and/or a public network, such as the Internet) through the network adapter 760. As shown in the figure, the network adapter 760 communicates with other modules of the electronic device 700 through the bus 730. It should be understood that although not shown in the figure, other hardware and/or software modules may be used in conjunction with the electronic device 700, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various exemplary embodiments of the present disclosure described in the above-mentioned exemplary methods.

A program product for implementing the above methods according to an exemplary embodiment of the present disclosure may employ a portable compact disc read-only memory (CD-ROM) and include program codes, and may be executed on a terminal device, such as a personal computer. However, the program product of the present disclosure is not limited thereto. In the present disclosure, the readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A game screen display method, wherein a graphical user interface is rendered by executing a game application and the graphical user interface is used to display a game screen corresponding to a first game perspective which corresponds to a first virtual character, the game screen display method comprising:
   determining a second virtual character according to a selection operation triggered by a user, when it is detected that the first virtual character is in a first specific state;
   acquiring a second game perspective corresponding to the second virtual character, and displaying a game screen corresponding to the second game perspective in the graphical user interface; and
   displaying a control operation screen corresponding to the second virtual character in the graphical user interface;
   wherein operation instruction information of a preset control in the control operation screen corresponds to a virtual action of the second virtual character in the game screen and when the first virtual character is in the first specific state, the operation instruction information synchronously gives, in the control operation screen, a visual indication of the preset control that triggers the virtual action of the second virtual character,
   wherein the second virtual character is a virtual character that satisfies a preset condition and is in a second specific state, the preset condition is that the second virtual character belongs to the same queue as the first virtual character and enables watching battle mode, and the second specific state is a surviving state.

2. The game screen display method according to claim 1, wherein after displaying the game screen corresponding to the second game perspective in the graphical user interface, the method further comprising:
   making a mark to a character identification corresponding to the second virtual character in the graphical user interface;
   wherein the character identification includes at least one of followings:
   a text identification; and
   an image identification.

3. The game screen display method according to claim 1, wherein after acquiring the second game perspective corresponding to the second virtual character, the method further comprising:
   intercepting the game screen corresponding to the second game perspective and the control operation screen;
   storing the game screen and the control operation screen, when it is detected that the game application is in a preset network environment.

4. The game screen display method according to claim 1, wherein the acquiring a second game perspective corresponding to the second virtual character comprising:
   invoking a perspective interface corresponding to the second virtual character, and acquiring the second game perspective based on the perspective interface.

5. The game screen display method according to claim 1, wherein before determining the second virtual character according to the selection operation triggered by a user, the method further comprising:
   acquiring character information of other virtual characters in the same queue as the first virtual character;
   generating a virtual character list based on the character information.

6. The game screen display method according to claim 5, wherein the determining the second virtual character according to the selection operation triggered by a user comprising:
   in response to the selection operation acted on the virtual character list, determining a virtual character corresponding to the selection operation in the virtual character list as the second virtual character.

7. The game screen display method according to claim 5, wherein the character information includes a historical selecting number and/or a character name,
   wherein the generating the virtual character list based on the character information comprising:
   generating the virtual character list based on order of the historical selecting number and/or order of a first letter included in the character name in alphabetical order.

8. The game screen display method according to claim 7, wherein the generating the virtual character list based on the order of the historical selecting number comprising:
   determining whether the historical selecting number is greater than a preset threshold;
   generating the virtual character list based on the order of the historical selecting number, if the historical selecting number is greater than the preset threshold.

9. The game screen display method according to claim 1, wherein the operation instruction information of the preset control comprises highlighting display information.

10. A non-transitory computer-readable storage medium having a computer program stored thereon, wherein the computer program, when being executed by a processor, implements a game screen display method,
   wherein a graphical user interface is rendered by executing a game application and the graphical user interface is used to display a game screen corresponding to a first game perspective which corresponds to a first virtual character, the game screen display method comprising:
determining a second virtual character according to a selection operation triggered by a user, when it is detected that the first virtual character is in a first specific state;
acquiring a second game perspective corresponding to the second virtual character, and displaying a game screen corresponding to the second game perspective in the graphical user interface; and
displaying a control operation screen corresponding to the second virtual character in the graphical user interface; wherein operation instruction information of a preset control in the control operation screen corresponds to a virtual action of the second virtual character in the game screen and when the first virtual character is in the first specific state, the operation instruction information synchronously gives, in the control operation screen, a visual indication of the preset control that triggers the virtual action of the second virtual character,
wherein the second virtual character is a virtual character that satisfies a preset condition and is in a second specific state, the preset condition is that the second virtual character belongs to the same queue as the first virtual character and enables watching battle mode, and the second specific state is a surviving state.

11. An electronic device, wherein comprising:
a processor; and
a memory for storing instructions executable by the processor;
wherein, the processor is configured to implement, by executing the instructions, a game screen display method,
wherein a graphical user interface is rendered by executing a game application and the graphical user interface is used to display a game screen corresponding to a first game perspective which corresponds to a first virtual character, the processor is configured to:
determine a second virtual character according to a selection operation triggered by a user, when it is detected that the first virtual character is in a first specific state;
acquire a second game perspective corresponding to the second virtual character, and display a game screen corresponding to the second game perspective in the graphical user interface; and
display a control operation screen corresponding to the second virtual character in the graphical user interface; wherein operation instruction information of a preset control in the control operation screen corresponds to a virtual action of the second virtual character in the game screen and when the first virtual character is in the first specific state, the operation instruction information synchronously gives, in the control operation screen, a visual indication of the preset control that triggers the virtual action of the second virtual character,
wherein the second virtual character is a virtual character that satisfies a preset condition and is in a second specific state, the preset condition is that the second virtual character belongs to the same queue as the first virtual character and enables watching battle mode, and the second specific state is a surviving state.

12. The electronic device according to claim 11, wherein after displaying the game screen corresponding to the second game perspective in the graphical user interface, the processor is further configured to:
making a mark to a character identification corresponding to the second virtual character in the graphical user interface;
wherein the character identification includes at least one of followings:
a text identification; and
an image identification.

13. The electronic device according to claim 11, wherein after acquiring the second game perspective corresponding to the second virtual character, the processor is further configured to:
intercept the game screen corresponding to the second game perspective and the control operation screen;
store the game screen and the control operation screen, when it is detected that the game application is in a preset network environment.

14. The electronic device according to claim 11, wherein the processor is configured to:
invoke a perspective interface corresponding to the second virtual character, and acquire the second game perspective based on the perspective interface.

15. The electronic device according to claim 11, wherein before determining the second virtual character according to the selection operation triggered by the user, the processor is further configured to:
acquire character information of other virtual characters in the same queue as the first virtual character;
generate a virtual character list based on the character information.

16. The electronic device according to claim 15, the processor is configured to:
in response to the selection operation acted on the virtual character list, determine a virtual character corresponding to the selection operation in the virtual character list as the second virtual character.

17. The electronic device according to claim 15, wherein the character information includes a historical selecting number and/or a character name,
wherein the processor is configured to generate the virtual character list based on order of the historical selecting number and/or order of a first letter included in the character name in alphabetical order.

18. The electronic device according to claim 17, wherein the processor is configured to:
determine whether the historical selecting number is greater than a preset threshold;
generate the virtual character list based on the order of the historical selecting number, if the historical selecting number is greater than the preset threshold.

* * * * *